United States Patent Office 3,129,090
Patented Apr. 14, 1964

3,129,090
METHOD OF CONTROLLING PLANT GROWTH
Robert L. Blain, Calgary, Alberta, Canada, assignor to Weed-Master (Western) Ltd., Calgary, Alberta, Canada
No Drawing. Filed Nov. 4, 1959, Ser. No. 156,550
(Filed under Rule 47(b) and 35 U.S.C. 118)
6 Claims. (Cl. 71—2.6)

This invention relates to the destruction of weeds and, more particularly, to the chemical control and destruction of weeds.

Chemical herbicides have been used extensively for the destruction of weeds and a great variety are readily available commercially. Some herbicides are nonselective and tend to destroy all forms of plant life, but others have been developed which exhibit a selective activity and have a much more pronounced effect on broad-leaf plants, such as weeds, than on narrow-leaf plants, such as grasses. Selective herbicides with their obvious advantages have found a wide area of use in the care and maintenance of lawns.

Commercial selective herbicides such as 2,4-dichlorophenoxyacetic acid, commonly known as 2,4-D, generally are available either as liquid concentrates or in powder form. Prior to use, the herbicide is diluted or dissolved in water and applied by spray, or, in the case of powders, the herbicide may be applied by dusting. The effectiveness of the herbicide is dependent on the accuracy of application, and is accordingly subject to variations in the skill of the operator, moisture, and particularly air currents and wind conditions.

If the concentrate is excessively diluted or the spraying or dusting fails to distribute an adequate amount, the herbicide may be rendered substantially ineffective. If, on the other hand, the herbicide is not sufficiently diluted or the amount applied is excessive, the operation is needlessly expensive and may injure the associated desirable plant life. While herbicides such as 2,4-D are considered to be selective, nevertheless, excessive dosages may cause a "burning" of the associated desirable plant life.

Conditions of heavy dew, rain or lawn watering will dilute applications of such herbicides applied by liquid sprays or dusting, and will result in ineffective treatments.

The application of herbicides by spraying or dusting further presents the problem of confining the herbicide to the area which is to be treated. Sprays or dusts applied even in a moderate breeze can carry to nearby broad-leaf plants, such as flowers, shrubs, hedges or trees, and damage or destroy them.

Accordingly, it is a primary object of this invention to provide a means whereby application of the herbicide by inexperienced operators may be restricted to the desired area.

It is another object of this invention to provide a means whereby herbicides may be applied by inexperienced operators evenly and in correct amounts.

It is a further object of this invention to provide a means whereby special equipment and techniques are unnecessary for the application of herbicides.

It is a further object of this invention to provide a means whereby herbicides may be applied in such a fashion that the application is resistant to dilution and removal by wind and water.

The present invention contemplates a herbicide applicator in the form of a solid body comprising a herbicide incorporated into a unitary solid wax carrier, said carrier with incorporated herbicide being attrition expendable to deposit an adherent coating of wax and an effective amount of associated herbicide on plant life when the solid carrier is passed in attrition contact with said plant life.

Additionally, the present invention embraces the method of controlling the growth of weeds which comprises passing an expendable unitary solid wax carrier containing associated herbicide in attrition contact with turf to deposit an adherent coating of wax and an effective amount of associated herbicide on the plant life of said turf.

The method and composite herbicide articles of the present invention afford numerous advantages in the control of weeds. Since the herbicide is associated with a solid wax carrier in a predetermined amount, no measuring, proportioning, mixing or preparatory steps are required at the time of application. The solid carrier need only be drawn over the turf and the correct amount of herbicide will be deposited. Moreover, the danger of herbicide coming in contact with nearby desirable broad-leaf plants is eliminated since actual contact between the carrier and the plant is required in order to distribute the herbicide. The associated wax not only forms an adherent coating which maintains the herbicide in intimate contact with the plant and retards evaporation of the herbicide but, further, provides protection against subsequent dews, rains or lawn waterings diluting or washing the herbicide off the plant. The wax carrier, while repelling moisture, permits diffusion of the herbicide into the surface of the plant. The herbicide most conveniently may be applied to lawns by drawing the solid carrier by hand by means of an attached cord or fastened behind a lawn mower; in such latter manner, the area to which the herbicide has been applied is always precisely defined.

The expendable unified solid wax applicator of the invention is characterized by a melting point above about 130° F. which, upon attrition contact with plant life, will deposit an adherent film on the plant. The term "wax" is employed herein in its generic sense and encompasses water insoluble waxes including vegetable waxes, such as carnauba wax, candelilla wax and the like; animal waxes, such as beeswax and the like; and mineral waxes, such as mineral oil paraffin waxes, as well as resinous materials which exhibit similar properties. Waxes which, per se, are too hard to exhibit attrition readily may be rendered suitable for the wax carrier of the present invention by blending with suitable proportions of diluent oils or softeners, such as, for example, lanolin, lard oil, petrolatum, mineral oil and the like. The wax and softener preferably are proportioned to provide a carrier which, with incorporated herbicide, will leave a deposit when the applicator is drawn across turf under its own weight. It will be understood, however, that the solid herbicide applicator may be formulated to leave the desired deposit when the applicator is drawn across turf under artificially applied weight. Selection and proportioning of wax and softener to provide the requisite properties is within the skill of the routineer.

Excellent results have been obtained employing crude mineral oil waxes having the desired softness. Comparable results have been achieved utilizing a refined petroleum wax blended with a mineral oil softener, such as crude oil, diesel oil and the like, to provide a carrier with a melting point within the above range.

Wax-compatible or water-dispersible herbicides, generally, are appropriate for the practice of the present invention. Wax-compatible halogenated aryloxy or alkylaryloxy monocarboxylic aliphatic acids, the salts and esters of said acids, and mixtures thereof produce excellent results. Such compounds embrace both saturated and unsaturated monocarboxylic aliphatic acid substituents, generally containing 2 to 9 carbon atoms. Likewise, the esters also embrace those formed with both saturated and unsaturated alcohols. Halogenated aryloxy or alkylaryloxy monocarboxylic aliphatic acids and their salts and esters are well-known in the art and are described, inter alia, in U.S. Patents 2,390,941, 2,558,762 and 2,732,291.

Halogenated phenoxyacetic or alkylphenoxyacetic acid, their esters and amines and mixtures thereof constitute preferred herbicides for the present invention. They are readily available, are extremely effective, and may be blended with the wax carrier with comparative ease. These herbicides include the widely used 2 methyl-4-chlorophenoxyacetic acid and 2,4-dichlorophenoxyacetic acid and their salts and esters, such as ethyl, butyl and octyl esters and amines, such as triethyl amine. This class of herbicides is more fully described in the above cited patents.

The amount of herbicide incorporated into the applicator may vary. The amount of herbicide incorporated into the applicator will depend, for example, upon the activity of the particular herbicide employed, upon the softness of the bar and upon the angle of attack between the bar and the turf. Having chosen the wax composition which is to be employed, it is only necessary to test the composition to determine its rate of attrition. Based upon the rate of attrition or "coverage" of a given wax composition, the amount of herbicide to be incorporated into the bar to provide disposition of the desired amount of herbicide readily may be determined. The preferred halogenated phenoxyacetic acids are incorporated into wax bars to provide a herbicide coverage of from about 0.5 pound per acre of turf to about 4 pounds per acre of turf. Generally, it is preferred that the composite bar contain at least about 10% by weight of herbicide.

The composite unitary solid wax herbicide article may take the form of a bar, block, slab or the like. Coupling means, such as wire mesh, corrugated cardboard or the like, may be cast into the form and permitted to extend from at least one edge thereof. While the bars may be five feet in length or more to accommodate commercial mowers, it is preferred to employ shorter bars of one or two foot lengths and attach the bars in gang fashion to a draw bar drawn by the commercial mower. The utilization of a number of shorter bars provides more uniform application, since the individual units will more closely follow the variations in the surface of the turf.

The herbicide and wax carrier may be blended by melting the wax and admixing the herbicide therewith. The herbicides decompose at elevated temperatures and, consequently, the temperature of the mixture should be maintained below the decomposition temperature of the particular herbicide employed. Since esters of aryloxy monocarboxylic aliphatic acid herbicides are generally more readily compatible with wax materials, they are preferred herbicides for the practice of the invention. In the event the less readily dispersible acids are employed, it is preferred to employ a softener in conjunction with the wax, since softeners tend to aid the dispersibility of the herbicide in the carrier.

In order to illustrate the present invention more fully, the following specific embodiments are set forth. These are included for illustrative purposes only and in no way are intended to limit the scope of the invention.

*Example 1*

2,4-dichlorophenoxyacetic acid was incorporated with raw wax and light gravity mineral oil in the following proportions:

| | Percent by weight |
|---|---|
| 2,4-dichlorophenoxyacetic acid | 12½ |
| Raw dark wax | 50 |
| Light gravity mineral oil | 37½ |
| | 100 |

The mixture was molded in the shape of a bar approximately twenty-two inches long, four inches wide and two inches thick. A metal mesh was cast into the mold to extend from one edge thereof for attachment to a draw line. The bar weighed three pounds.

*Example 2*

The tri-ethyl amine of 2,4-dichlorophenoxyacetic acid was incorporated with paraffin and light mineral oil in the following proportions:

| | Percent by weight |
|---|---|
| Tri-ethyl amine of 2,4-dichlorophenoxyacetic acid | 12½ |
| Paraffin | 50 |
| Light mineral oil | 27½ |
| Stearic acid | 10 |
| | 100 |

This was cast into a block of the same dimensions as the block of Example 1 and was found to weigh three pounds.

*Example 3*

A weed killer marketed under the trade name MCP (2 methyl 4 chlorophenoxyacetic acid) was mixed in the following proportions:

| | Percent by weight |
|---|---|
| 2 methyl 4 chlorophenoxyacetic acid | 12½ |
| Raw dark wax | 50 |
| Light mineral oil | 37½ |
| | 100 |

This was cast into a block the same dimensions as the block of Example 1 and was found to weigh three pounds.

*Example 4*

2,4-dichlorophenoxyacetic acid was incorporated with raw wax and crude oil in the following proportions:

| | Percent by weight |
|---|---|
| 2,4-dichlorophenoxyacetic acid | 12½ |
| Raw dark wax | 60 |
| Light mineral oil, 38 API | 27½ |
| | 100 |

The mixture was molded in the shape of a bar approximately twenty-two inches long, four inches wide and two inches thick. A metal mesh was cast into the mold to extend from one edge thereof for attachment to a draw line. The bar weighed three pounds.

The raw dark wax employed was a mineral oil wax characterized by a dropping point of 148° F., an oil content of 17%, a viscosity at 210° F. of 70 SSU and a penetration at 77° F. of 60 mm. The mineral oil was a paraffin base which had a gravity of 38° API.

*Example 5*

The herbicide, 2 methyl 4 chlorophenoxyacetic acid, was mixed in the following proportions:

| | Percent by weight |
|---|---|
| 2 methyl 4 chlorophenoxyacetic acid | 12½ |
| Raw dark wax, dropping point 148° F. | 60 |
| Light mineral oil, 38° API | 27½ |
| | 100 |

This was cast into a block the same dimensions as the block of Example 1 and was found to weigh three pounds.

*Example 6*

The iso-octyl ester of 2,4-dichlorophenoxyacetic acid was incorporated with wax, petrolatum and oil in the following proportions:

| | Percent by weight |
|---|---|
| Iso-octyl ester of 2,4-dichlorophenoxyacetic acid | 25 |
| White scale wax | 33.75 |
| Pacific base oil, pale | 30 |
| Petrolatum | 11 |
| Perfume | 0.25 |
| | 100 |

The mixture so formulated was formed into a bar. The mineral oil white scale wax (marketed by Standard Oil Company of California as white scale 145/155 AMP) exhibited an AMP melting point of 145–155° F. and had a maximum oil content of 1.5%. The pale Pacific base oil (marketed by Standard Oil Company of California as Pacific Base Oil, 100 Pale) exhibited a gravity of 23–27 API, a minimum flash point (Cleveland cup method) of 305° F., a viscosity at 100° F. of 100–110 SSU and a maximum pour point of −25° F. Finally, the petrolatum (marketed by Standard Oil Company of California as Standard Petrolatum 110) exhibited a melting point of 155–170° F., a viscosity at 210° F. of 85–120 SSU, a maximum penetration of 40 and a maximum oil content of 30%.

When the bars of the above examples were tested by drawing them over turf, they effectively controlled the growth of weeds in the turf but produced substantially no adverse effect on the grasses.

Many variations of the present invention will be apparent to those skilled in the art. Accordingly, the present invention is intended to be limited only by the scope of the appended claims.

This is a continuation-in-part of application Serial No. 683,934, filed September 16, 1957, now abandoned.

I claim:

1. The method of controlling the growth of plant life which comprises providing a solid body of a solid wax carrier containing associated herbicide with the body having shape-retaining solidity and being attrition expendable, and passing said solid body in attrition contact with plant life to deposit an adherent coating of wax and an effective amount of associated herbicide on said plant life.

2. The method of claim 1 wherein the solid wax carrier with incorporated herbicide exhibits a melting point in excess of about 130° F.

3. The method of claim 1 wherein the carrier contains at least about 10% by weight, based on the total weight of carrier and herbicide, of a herbicide selected from the group consisting of halogenated aryloxy monocarboxylic aliphatic acids, halogenated alkylaryloxy monocarboxylic aliphatic acids, and esters and amines of said acids, and mixtures thereof.

4. The method of claim 1 wherein the carrier contains at least about 10% by weight, based on the total weight of carrier and herbicide, of a herbicide selected from the group consisting of halogenated phenoxyacetic acid, halogenated alkylphenoxyacetic acid, the esters and amines of said acids, and mixtures thereof.

5. The method of claim 1 wherein said carrier consists of a water insoluble wax which is attrition expendable when passed in attrition contact with plant life.

6. The method of claim 1 wherein said carrier consists of a hard wax blended with a softener to provide a body that is attrition expendable when passed in attrition contact with plant life.

References Cited in the file of this patent

UNITED STATES PATENTS

| 2,580,653 | Bridgeman | Jan. 1, 1952 |
| 2,819,995 | Wassell | Jan. 14, 1958 |

FOREIGN PATENTS

| 606,087 | Great Britain | Aug. 5, 1948 |

OTHER REFERENCES

Carbowax Compounds and Polyethylene Glycols, by Carbide and Carbon Chemicals Corp., June 30, 1946, 19 pages (page 7 of particular interest, 71–2.1).

Thimann, in "Science," July 25, 1947, vol. 106, page 87, 71–2.6.